(12) United States Patent
Cassiers et al.

(10) Patent No.: US 7,778,346 B2
(45) Date of Patent: Aug. 17, 2010

(54) UPSTREAM POWER CUTBACK

(75) Inventors: Raphael Cassiers, Braine-l 'Alleud (BE); Miguel Peeters, Woluwe-Saint-Lambert (BE)

(73) Assignee: Broadcom Corporation, Irvine, CA (US)

( * ) Notice: Subject to any disclaimer, the term of this patent is extended or adjusted under 35 U.S.C. 154(b) by 587 days.

(21) Appl. No.: 11/146,097

(22) Filed: Jun. 7, 2005

(65) Prior Publication Data

US 2005/0271127 A1 Dec. 8, 2005

Related U.S. Application Data

(60) Provisional application No. 60/577,214, filed on Jun. 7, 2004.

(51) Int. Cl.
*H04B 1/38* (2006.01)
*H04L 5/16* (2006.01)

(52) U.S. Cl. .................. 375/290; 375/219; 375/221

(58) Field of Classification Search ............. 375/219; 455/73
See application file for complete search history.

(56) References Cited

U.S. PATENT DOCUMENTS

| | | | | |
|---|---|---|---|---|
| 5,457,811 A * | 10/1995 | Lemson | .................... | 455/67.11 |
| 5,784,410 A * | 7/1998 | Nakano | ....................... | 375/345 |
| 6,215,793 B1 * | 4/2001 | Gultekin et al. | ............. | 370/465 |
| 6,356,585 B1 | 3/2002 | Ko et al. | | |
| 6,711,207 B1 | 3/2004 | Amrany et al. | | |
| 6,778,954 B1 * | 8/2004 | Kim et al. | .................... | 704/226 |
| 6,829,307 B1 * | 12/2004 | Hoo et al. | .................... | 375/260 |
| 6,952,589 B1 * | 10/2005 | Mantha | ....................... | 455/501 |
| 2003/0185311 A1 | 10/2003 | Kim | | |
| 2004/0218562 A1 * | 11/2004 | Orava et al. | .................. | 370/329 |
| 2004/0218882 A1 * | 11/2004 | Bickham et al. | ............. | 385/127 |

FOREIGN PATENT DOCUMENTS

| WO | WO 01/39481 A1 | 5/2001 |
|---|---|---|
| WO | WO 01/43415 A2 | 6/2001 |

OTHER PUBLICATIONS

European Search Report issued Jan. 25, 2008 for Appl. No. EP 05011273, 4 pages.

* cited by examiner

*Primary Examiner*—David C Payne
*Assistant Examiner*—Brian J Stevens
(74) *Attorney, Agent, or Firm*—Sterne, Kessler, Goldstein & Fox P.L.L.C.

(57) ABSTRACT

An upstream signal power in a communication system is optimized. At least one system parameter is determined and a bits and gains table is modified. For example, a maximum received power parameter for the transmitting device is used by the receiving device to calculate a power backoff parameter. The power backoff parameter is used to calculate the bits and gains table which is then used by the transmitting device. The new SNR may be estimated. This estimation may distinguish between noise sources that vary with the signal level received and those that do not.

14 Claims, 2 Drawing Sheets

UPSTREAM POWER CUTBACK

CROSS-REFERENCE TO RELATED APPLICATION

This application claims benefit to U.S. Provisional Application No. 60/577,214, filed on Jun. 7, 2004, entitled "Upstream Power Cutback", which is incorporated herein by reference in its entirety.

FIELD OF THE INVENTION

The present invention relates generally to Asymmetrical Digital Subscriber Line (ADSL) communication systems. More specifically, the present invention relates to determining the power level for the upstream direction in an ADSL communication system.

BACKGROUND OF THE INVENTION

Broadband communication networks are used in a variety of high speed application services such as internet access, video conferencing, video on demand, and interactive TV. Although fiber optic cable is the preferred transmission media for such high data rate services, the lack of fiber optic cables in existing networks and the prohibitive costs of installing such optical networks have led telephone companies around the world to include existing twisted-pair loops in their next generation broadband access networks. Because current telephone wiring connections were not designed to support high speed data communications, technologies were developed to increase the transmission capabilities of existing telephone wiring.

One technology for providing such high data rate services on existing twisted-pair connections is Asymmetrical Digital Subscriber Line (ADSL). ADSL transfers data over the higher frequencies in the twisted-pair copper wires that currently connect most homes and businesses. ADSL accomplishes this by increasing the transmission capabilities of the current telephone wiring connections. Thus, ADSL technology enables data to be exchanged over the twisted-pair copper wires at much higher speeds than conventional modems and analogue lines.

Several standards have been adopted and published by the International Telecommuncation Union (hereinafter "ITU") to standardize use and performance of ADSL systems. For example, the ADSL1 standard (G.992.1) uses the discrete multi-tone (DMT) modulation technology. DMT modulation divides the available bandwidth of communications channels into multiple carriers, also referred to as bins or sub-channels, and employs the multiple carriers for both upstream and downstream communication. Each carrier is allocated a number of bits to send with each transmission. Frequency-division-multiplexing is often used, where upstream and downstream communication use carriers in different frequency bands. Thus, DMT modulation maximizes the available channel capacity by using a large number of carriers rather than a single carrier, and thereby optimizes performance of the transmission.

Communication between a central office and a customer premise typically travels in both a downstream direction and an upstream direction. In the downstream direction, it is state of the art to cut back (i.e. reduce) power. However, in the upstream direction, the power level of the transmission is fixed in the state of the art. Currently, in ADSL transceivers compliant with the ADSL1 standard (ITU G.992.1 and G.992.2 standards), there is no way to reduce the transmit power of the signals generated by the CPE when operating on short distances. While a connection between the central office side and the subscriber side is established, the transceivers of both modems continue to monitor the changing signal-to-noise ratios on the line and swap bits from one carrier to another to maintain system performance.

Some disadvantages in using a fixed power level in the upstream direction are power consumption and crosstalk. A central office has to deal with modems both near and far. Modems which are too near often result in power transmissions which are unnecessarily high. Modems which are far have high power attentuation. The result is a huge difference in the dynamic power range. Cross-talk affects all types of DSL transmission. If the effect of signal crosstalk in the loop plant is not reduced, then the upstream signal power variations seen at the central office may be so high that the crosstalk coupling degrades the upstream performance of the long lines.

Recommendation G.992.3 published by the International Telecommunication Union (ITU) (also referred to as ADSL2 or G.992.3 standard), which is incorporated herein by reference, provides an upstream power backoff procedure by introducing a maximum received power parameter: MAXRXPWR. This parameter defines the maximum power that the Central Office Equipment (hereinafter "CO") should receive from the Customer Premise Equipment (hereinafter "CPE"). During the Channel discovery phase of the initialization sequence, the CO measures its received signal power and computes the amount of power backoff that should be applied on the upstream signal. This backoff value is communicated to the CPE during this same phase of the initialization sequence in the C-MSG-PCB message. Thus, the solution in G.992.3 ensures that the configured maximum receive power will never be exceeded. The desirable result is the reduction of the effect of signal crosstalk in the loop plant.

While the ADSL2 standard (G.992.3) provides one solution to the upstream power backoff procedure, it is not widely useable since many existing CPE modems do not currently support the ADSL2 (G.992.3) standard. Devices which operate in accordance with ADSL1 (ITU recommendations G.992.1 or G.992.2 and which are incorporated herein by reference) do not support a MAXRXPWR control parameter and hence are not able to apply a power backoff to modify the upstream power signal. Moreover, unlike the ADSL2 standard, the signal-to-noise ratio (SNR) that would result from applying such a power backoff in an ADSL1 compliant device cannot be directly measured. Indeed, there is no provision in the ADSL1 standard to offer a specific known signal in which the transmit power is reduced that can be used by the receiver to measure the resulting SNR. Therefore, a solution is still needed to provide upstream power cutoff in ADSL transceivers compliant with the ADSL1 standards.

It is an object of the present invention to solve the aforementioned problems and more specifically, to solve the aforementioned problems by providing a communication system which reduces the upstream power level in an ADSL communication system.

SUMMARY OF THE INVENTION

The present invention comprises a system and method, e.g., a Central Office line card and a method for training a central office modem, substantially as shown in and/or described in connection with at least one of the figures, as set forth more completely in the claims.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known processes and steps have not been described in detail in order not to unnecessarily obscure the present invention.

Embodiments of the invention are discussed below with references to FIGS. 1 and 2. However, those skilled in the art will readily appreciate that the detailed description given herein with respect to these figures is for explanatory purposes as the invention extends beyond these limited embodiments.

Figure 1:
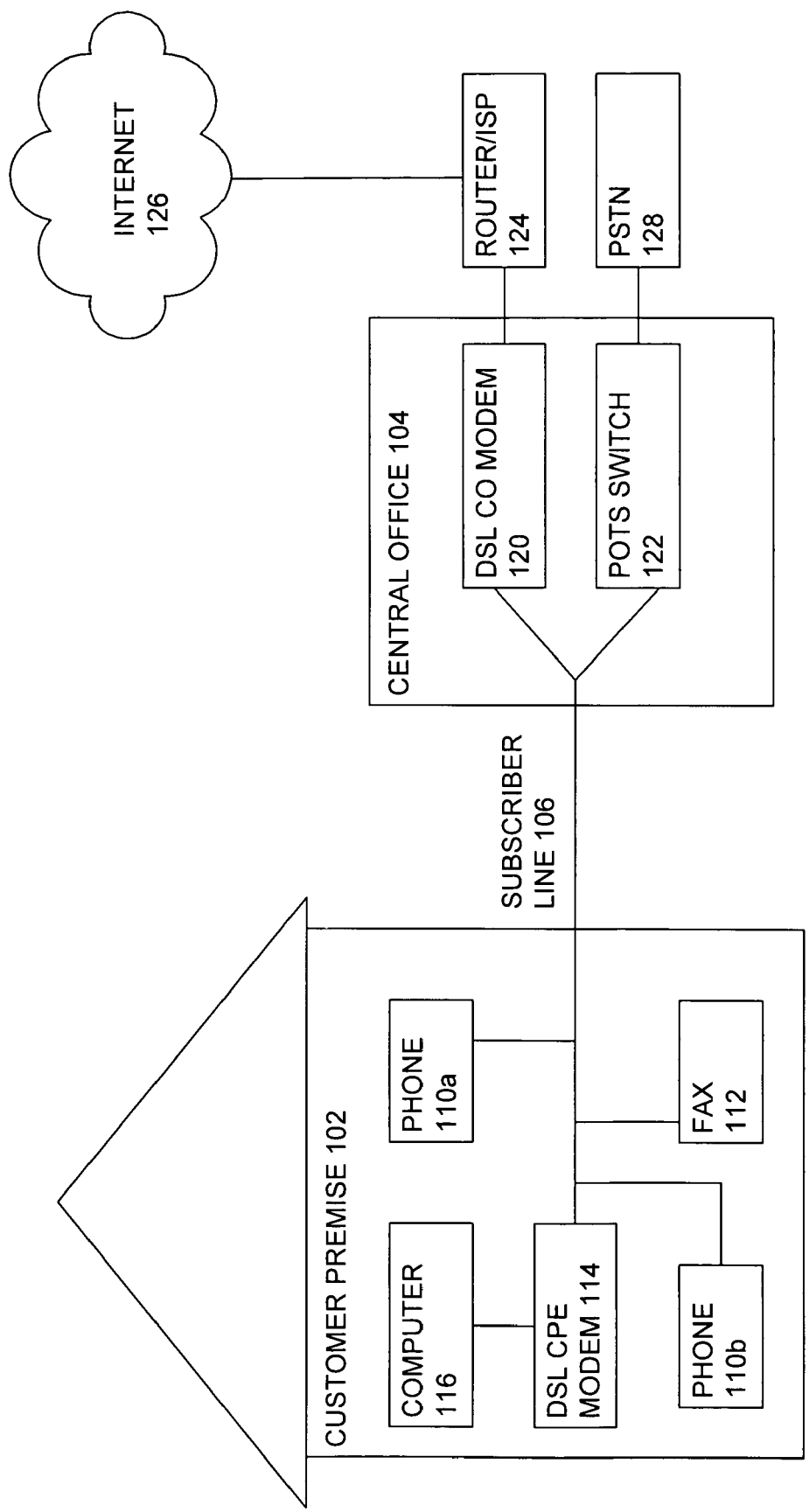
FIG. 1 illustrates a block diagram of a communications system in accordance with one embodiment of the present invention.

Referring now to FIG. 1, there is shown a block diagram of a communications system 100 in accordance with one embodiment of the present invention. The communications system 100 enables voice communications, video, and data services to be exchanged based on bi-directional transfer of Internet Protocol (IP) or Asynchronous Transfer Mode (ATM) traffic between a customer premise 102 and a central office 104 via a subscriber line 106.

In the example communications system 100, the customer premise end 102 supports various customer premise devices which may be coupled to the subscriber line 106. For example, devices such as telephones 110a, 110b, a fax machine 112, a xDSL CPE (Customer Premise Equipment) modem 114 and the like may all be coupled to the subscriber line 106. A personal computer 116 may be connected via xDSL CPE modem 114. At the central office end 104, various central office equipment may be coupled to the subscriber line 106, such as a xDSL CO (Central Office) modem 120 and a POTS switch 122. XDSL CO modem 120 may be further coupled to a router or ISP 124 which allows access to the Internet 126. POTS switch 122 may be further coupled to a PSTN 128. The subscriber line 106 provides for the high-speed, reliable, and secure transport of data between the CO xDSL modem 120 and the remote xDSL CPE modem 114. The subscriber line 106 may comprise twisted-pair copper telephone lines, coaxial cable, fiber optic cable, or a combination of coaxial cable and fiber optic cable linked via one or more fiber nodes. The CO xDSL modem 120 is typically found within a telephone company's central office, and the remote xDSL CPE modem is found within individual homes and businesses. In the example communications system 100 of FIG. 1, only one remote xDSL CPE modems 114 is shown. In general, the communications system 100 may include any number and type of central or remote xDSL modems.

The system will be described hereinafter with respect to DSL data transmission services, although it is not limited thereto. The modems 114, 120 may transmit and receive data pursuant to various telecommunications standards such as the ADSL1 ITU G.992.1 and G992.2 standards. In accordance with one embodiment of the present invention, system 100 provides for data to be sent in each direction between the CO xDSL modem 120 and the xDSL CPE modem 114. The remote xDSL modem 114 operates as an interface between the subscriber line 106 and at least one attached user device. In particular, the remote CPE xDSL modem 114 performs the functions necessary to convert downstream signals received over the subscriber line 106 into IP or ATM data packets for receipt by an attached user device. Downstream refers to the direction of transmission from a telephone company's central office to a remote location such as a home or business. Additionally, the remote xDSL CPE modem 114 performs the functions necessary to convert IP or ATM data packets received from the attached user devices such as 116 into upstream burst signals suitable for transfer over the subscriber line 106. Upstream refers to the direction of transmission from a remote business or home to a telephone company's central office. Data other than IP or ATM packets may as well be carried over the communications system 100.

During the initialization procedure between the xDSL CO modem 120 and the xDSL CPE modem 114, the CO modem 120 receives a maximum received power configuration parameter (MAXRXPWR) from an operator for the system. Alternatively, a CO modem may use a pre-selected default value for MAXRXPWR constraint. The CO modem 120 then measures the received power signal from the CPE modem 114 and compares it to the maximum received power configuration parameter. The CO modem then uses the received power signal and the selected MAXRXPWR constraint to compute the appropriate power backoff required to achieve the optimal upstream power level. The CO modem 120 then adjusts the bit and gain allocation tables to ensure that the appropriate power backoff will be achieved by the CPE modem 114. The bit and gain allocation tables are computed in such a way that: 1) the achieved bit rate is optimized within the operator constrains; 2) the noise margin is well equalized amongst the different sub-carriers used; and 3) the noise margin doesn't exceed the configured maximum noise margin. This third constraint is typically achieved by requesting low gain values to the CPE, thereby lowering the CPE transmit power. The CO modem 120 then sends the bit and gain allocation tables to the CPE modem 114. The CPE modem 114 then uses the modified bit and gain allocation tables to configure its transmit path and optimize the upstream power level of its signal. In a preferred embodiment, DSL CO modem 120 incorporates a BCM6411 or BCM6510 device, produced by Broadcom Corporation of Irvine, Calif., to implement its various functions.

Thus, the present invention allows the CO modem 120 to indirectly control the CPE transmitted power. As a result, a CPE modem 114 operating in accordance with the ADSL1 standard is no longer restricted to using the same nominal upstream transmit power, The present invention ensures that the selected maximum received power constraint for the CO modem will never be exceeded resulting in the reduction of the effect of signal crosstalk in the loop plant.

Figure 2:
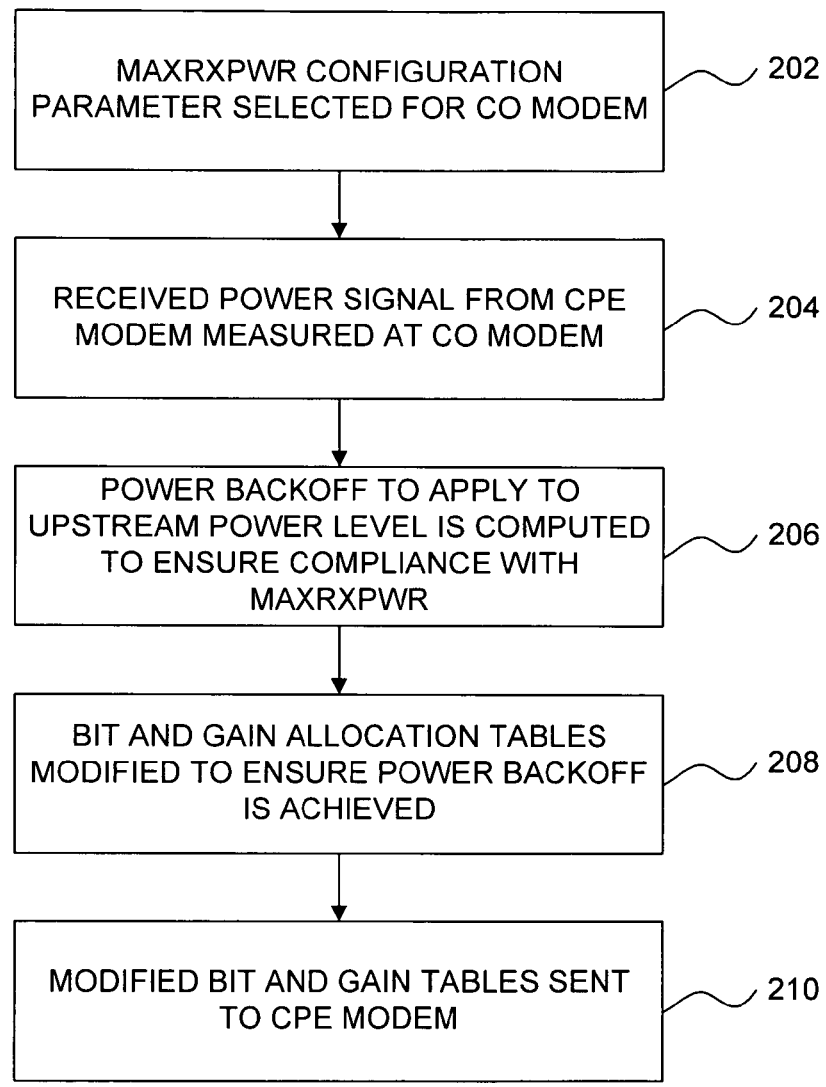
FIG. 2 is a flow chart of the steps for optimizing the upstream signal power level in a communication system in accordance with one embodiment of the present invention.

Referring now to FIG. 2, there is shown a flow chart of the steps for optimizing the upstream signal power level in a communication system in accordance with one embodiment of the present invention. At step 202, the CO modem first receives a maximum received power (MAXRXPWR) configuration parameter for the CO modem. The MAXRXPWR parameter defines the maximum power that the CO modem should receive from the CPE modem. The value of MAXRXPWR may either be an operator configuration, for example, as part of a multi-standard line profile, or it may be a previously chosen default value. Then, at step 204, the CO modem measures the received power signal from the CPE modem. The CO modem then uses the received power signal to compute, at step 206, the amount of power backoff that needs to be applied by the CPE modem transmitter to ensure that the received power at the CO meets this maximum received power constraint. The bit and gain allocation tables are then modified at step 208 to ensure that this power backoff is achieved. The modified bit and gain allocation tables are then sent to the CPE modem which uses the tables to configure its transmit path and optimize the upstream power level of its signal.

Thus, the present invention provides a maximum received power constraint in systems operating according to the ADSL1 standard. This maximum received power constraint is then used to determine a power backoff which is used in turn in the derivation of the bit and gain tables used in ADSL1 systems to optimize the upstream power level.

Unlike the ADSL2 standard, the signal-to-noise ratio (SNR) that results from applying the power backoff of the present invention in an ADSL1 compliant device cannot be directly measured. Indeed, there is no provision in the ADSL1 standard to offer a specific known signal in which the transmit power is reduced that can be used by the receiver to measure the resulting SNR. The present invention overcomes this inability to directly measure the SNR that results from applying the power backoff by estimating the SNR. The MAXRXPWR configuration parameter enables the CO modem to compute a gain table (i.e. an individual gain per DMT carrier) that achieves a certain power backoff. The use of the lower gain values may negatively impact the SNR available on the DMT carriers on which this gain is applied. This lower SNR may limit the constellation size, and hence the number of bits that can be placed on that carrier. Thus, the step of the present invention of estimating accurately the SNR resulting from the lower gains aims at maximizing the number of bits that can be used in order to achieve the best possible rate despite the lower upstream power used.

In one embodiment of the present invention, an extra backoff constraint is included by assuming that the lower gains used will lead to a proportionally lower SNR at the receiver. Based on this assumption, the bit and gain allocation tables can be readily computed and the maximum power constraint will be easily met.

In another embodiment of the present invention, different noise sources are distinguished. On short loops, the SNR in the upstream direction is not significantly influenced by the absolute signal power. Indeed, the dominant noise sources in those conditions are actually directly related to the actual received signal power. For example, ADC (Analog to Digital Converter) noise remains at a constant level relative to the receive signal power, at least if an LNA (Low Noise Amplifier) with a programmable gain is used in front of it to keep the ADC input signal power constant. This is typically the case when an AGC (Automatic Gain Control) circuit is used. Additionally, Inter-Symbol Interference "noise" (not a true noise but actually a signal distortion component) scales linearly with the received signal power.

Therefore, the present invention distinguishes between noise sources whose power scales with the received signal (Np) and those that remain constant with received signal power changes (Nc). More specifically, the present invention first identifies the proportional and constant contributors of the total noise energy using the equation:

$$N=Np+Nc$$

Then, the invention computes:

$$S'/N'$$

where S'=aS the reduced signal level, and N' the noise present with this reduced signal level.

As a result:

$$S'/N'=aS/(aNp+Nc)$$

In one embodiment, several techniques can be used to distinguish between several noise sources and include several noise measurements performed in different conditions. For example, the present invention may distinguish noise in REVERB versus noise in Medley and distinguish noise from distorsion. The present invention may also distinguish noise in simplex (US only/DS only) versus noise in duplex and distinguish echo noise from Rx noise. Finally, the present invention may distinguish noise with higher/lower AGC setting and distinguish LNA noise from ADC noise.

Thus, the present invention accurately computes the SNR loss that will result from a decrease in upstream signal transmit power, even if this resulting SNR cannot be effectively measured. On short loops where the MAXRXPWR constraint applies, the SNR will in most cases be completely dominated by internal noise. An accurate SNR prediction may lead to a resulting SNR that is easily 6 dB better than the simple conservative prediction. This in turn translates into an upstream rate improvement of approximately 200 kb/s.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for reducing a power level of a communications signal in a communication system comprising a first transceiver configured to receive the communications signal transmitted from a second transceiver, comprising:

determining a received power of the communications signal as received at the first transceiver;

computing a reduced gain value for the second transceiver based on the received power;

computing an estimated signal to noise ratio, expected to result from a reduced power level of the communications signal, based on the reduced gain value;

modifying a bit and gain table using the estimated signal to noise ratio; and reducing a transmit power of the second transceiver in accordance with one or more entries of the bit and gain table, wherein computing the estimated signal to noise ratio comprises distinguishing between first category noise sources including noise sources whose power scales with the input signal received by the first transceiver and second category noise sources including noise sources that remain constant with received signal power changes, and wherein computing the estimated signal to noise ratio comprises calculating the estimated signal to noise ratio based on an equation $S'/N'=aS/(aNp+Nc)$, where $S'=aS$ represents the reduced power level of the communications signal expected to result from the reduced gain level, N' represents an estimated noise level predicted to be present at the reduced power level, Np represents a noise level from the first category noise sources present, and Nc represents a noise level from the second category noise sources present.

2. The method of claim 1, wherein the modifying comprises lowering at least one gain in the bit and gain table.

3. The method of claim 1, further comprising:
selecting a maximum received power constraint for the first transceiver.

4. The method of claim 3, wherein the computing the estimated signal to noise ratio is performed before modifying the bit and gain table.

5. The method of claim 1, further comprising determining a maximum bits per carrier based on the estimated signal to noise ratio.

6. The method of claim 1, wherein the first and second transceivers operate in accordance with an ADSL1 standard.

7. A system for reducing a power level of a communications signal in a communication system comprising a first transceiver configured to receive the communications signal transmitted from a second transceiver, comprising:
a system parameter processor configured to determine a received power of the communications signal as received at the first transceiver and compute a reduced gain value for the second transceiver based on the received power;
a signal to noise ratio estimation component configured to compute an estimated signal to noise ratio, expected to result from a reduced transmitted power of the communications signal, based on the reduced gain value; and
a bit and gain table modifier configured to modify a bit and gain table using the estimated signal to noise ratio to reduce a transmit power of the second transceiver,
wherein the signal to noise ratio estimation component is further configured to distinguish between first noise category sources including noise sources whose power scales with the input signal received by the first transceiver and second category noise sources including noise sources that remain constant with received signal power changes, and
wherein the signal to noise ratio estimation component is further configured to calculate the estimated signal to noise ratio based on an equation $S'/N'=aS/(aNp+Nc)$, where $S'=aS$ represents the reduced power level of the communications signal expected to result from the reduced gain level, N' represents an estimated noise level predicted to be present at the reduced signal level, Np=a noise level from the first category noise sources present, and Nc represents a noise from the second category noise sources present.

8. The system of claim 7, wherein at least one gain in the bit and gain table is lowered.

9. The system of claim 7, wherein the system parameter processor is further configured to compute the reduced gain value by comparing a maximum received power constraint for the first transceiver to the received signal power as measured at the first transceiver and to determine a power back off parameter for the second transceiver.

10. The system of claim 7, wherein the signal to noise ratio estimation component determines a signal to noise ratio (SNR) loss resulting from a decrease in the upstream signal power level.

11. The system of claim 7, wherein the first and second transceivers operate in accordance with an ADSL1 standard.

12. A method for reducing a power level of a communications signal in a communication system comprising a first transceiver configured to receive the communications signal transmitted from a second transceiver, comprising:
selecting a maximum received power configuration parameter for the first transceiver;
measuring at the first transceiver a received power of the communications signal;
computing a reduced gain value for the second transceiver based on the received power and the maximum received power configuration parameter;
computing an estimated signal to noise ratio, expected to result from a reduced power level of the communications signal, based on reduced gain value; and
determining a bit and gain table using the estimated signal to noise ratio to reduce a transmit power of the second transceiver,
wherein the computing the estimated signal to noise ratio comprises distinguishing between first category noise sources including noise sources whose power scales with the input signal received by the first transceiver and second category noise sources that remain constant with received signal power changes, and
wherein the computing the estimated signal to noise ratio further comprises calculating the estimated signal to noise ratio based on an equation $S'/N'=aS/(aNp+Nc)$, where $S'=aS$ represents the reduced power level of the communications signal expect to result from the reduced gain level, N' represents an estimated noise predicted to be present at the reduced power level, Np represents a noise level from the first category noise sources present, and Nc represents a noise level from the second category noise sources present.

13. The method of claim 12, wherein the first and second transceivers operate in accordance with an ADSL1 standard.

14. The method of claim 12, further comprising determining a maximum bits per carrier based on the estimated signal to noise ratio.

* * * * *